United States Patent Office 3,501,322

Patented Mar. 17, 1970

3,501,322

GLAZED CERAMIC SUBSTRATE FOR ELECTRONIC MICROCIRCUITS

William H. Dumbaugh, Jr., Corning, N.Y., and Joseph W. Malmendier, Piscataway, N.J., assignors to Corning Glass Works, Corning, N.Y., a corporation of New York No Drawing. Filed Aug. 16, 1967, Ser. No. 660,940
Int. Cl. C03c 5/02
U.S. Cl. 106—48 9 Claims

ABSTRACT OF THE DISCLOSURE

A substrate material for use in microcircuit work, and more particularly a substantially alkali free improved glazed ceramic substrate of high alumina content for thin-film circuitry, said glaze consisting essentially of: 60–75 mole percent silica, 2.5–12.5 mole percent alumina, 2.5–10.0 mole percent lanthanum oxide, 15–30 mole percent barium oxide, and 0–5 mole percent boric oxide.

A thin-film circuit is a series of passive and active circuit elements in thin-film form deposited on an inert substrate. The advantages obtained by thin-film circuitry are lower cost, higher reliability, smaller size, and greater ease of manufacture compared to conventional circuit elements. Over the past few years the number of materials used in film circuit elements has grown to include a wide variety of conductive, resistive, dielectric, semiconductive, superconductive, and magnetic films, as well as various substrates and encapsulation materials. Among the most commonly used conductive films are copper, aluminum, gold, platinum, and tantalum. Resistive films include Nichrome, anodized tantalum, chromium-silicon monoxide cermets, tin oxide, palladium-based cermets, and others. The most important dielectric films are silicon monoxide and tantalum oxide. Semiconductive films such as silicon, germanium, and compound semiconductors may be used. Also super-conductive films such as tin and its alloys are being studied. Magnetic films include permalloys and various special alloys.

The substrates should have properties which are compatible with the properties of the thin-film materials being applied. Thus, the substrates should be able to tolerate the processing conditions required for film deposition, should have a high electrical resistivity, a low dielectric loss, good chemical durability, and a high thermal conductivity. Furthermore, the substrate should be free of impurities such as alkali ions which may adversely affect circuit performance. The smoothness required of a substrate is generally very significant. The sensitivity of films to surface roughness will, at least to some extent, depend upon the nature of the film, however, vapor deposited thin film capacitors are quite sensitive to substrate imperfections. Uneven thickness of dielectric films and field emission from electrode irregularities lead to low breakdown voltage, especially for high value capacitors. Magnetic films are also quite sensitive to surface roughness.

The most commonly used substrate material is glass usually in the form of microscopic slides since they are smooth, very even in size, and readily available. A wide variety of other substrates have been studied including other glasses, ceramics, glazed ceramics, and in some special cases, single crystals, dielectric coated metals, glass ceramics, and organic polymers. Of this group glass has a particular advantage in that it can be formed or polished to give a very uniform and smooth surface.

Another important substrate material is ceramics. Aside from the higher softening temperatures available in ceramic materials, their principal advantage over glass is their higher thermal conductivity. This is particularly true for high purity alumina and beryllia. The surface roughness of ceramics in deviations from flatness depends on the manufacturing process, but usually is in the range of 50 micro-inches, which is fairly rough. Careful polishings can to some extent reduce the roughness of the surface, but may leave other imperfections. As a result of this difficulty and in an effort to combine the thermal conductivity of ceramics with the smoothness of glass, glazed alumina substrates have been developed. Although the expansion coefficient of a glazed ceramic substrate depends on the ceramic, the other important surface properties are determined primarily by the composition and thickness of the glaze.

The choice of glaze composition is limited not only by the desired glass properties, but also by the interactions which may occur between the glaze and the base ceramic. A mismatch in expansion coefficients, for example, may result in substrate warpage or "bowing" of the substrate. When glazing at temperatures low enough to prevent crystallization at the glaze ceramic interface, the use of lead or alkali in the glaze may be required which in turn may affect the film device. A serious problem which arises in the forming of relatively large area (greater than ½ inch x ½ inch) alumina substrate up to about 0.01 inch thickness is that during firing of the glaze the piece will usually have some warping and loss of flatness. The effect of surface roughness on electronic films typically results in electrical breakdown of thin film capacitors.

It is therefore an object of the present invention to provide an improved glazed ceramic body for use as a substrate for thin-film circuitry.

Another object of the invention is to provide a glaze for a high alumina content ceramic body.

In accordance with the present invention, we have discovered an improved glazed ceramic body of high alumina content for use as a substrate in microcircuitry. The improvement is obtained by using a glaze consisting essentially as calculated from the batch on the oxide basis of:

| Ingredient: | Mole percent |
|---|---|
| $SiO_2$ | 60–75 |
| $Al_2O_3$ | 2.5–12.5 |
| $La_2O_3$ | 2.5–10.0 |
| BaO | 15–30 |
| $B_2O_3$ | 0–5 |
| MO | 0–10 |

wherein M is a member selected from the group consisting of Mg, Ca, Sr and mixtures thereof, said glaze having a thermal coefficient of expansion of about $58–75 \times 10^{-7}$ per ° C. (25–600° C.). The properties of the alumina substrate glaze are outstanding. There is an absence of bow in the glaze-substrate composite, the resistivity of the glaze is very high, the acid durability of the glaze is good, and the viscosity of the glaze is in the proper range. The glaze forms a smooth, glossy, continuous and uniform surface.

The high alumina content ceramic typically contains at least about 94 percent alumina plus minor amounts of calcium oxide and silica. The thermal coefficient of expansion is approximately $62 \times 10^{-7}$ per ° C. and the thermal conductivity is about 0.073 calories per centimeter per second per ° C. at 25° C. Such high alumina content ceramics are commercially available from the American Lava Corp., Chattanooga, Tenn. A particularly desirable method of forming high alumina content wafers having dimensions of 1½ x 2 x 0.30 inches is described by Andrews et al. in U.S. application Ser. No. 471,708 filed July 13, 1965. This process involves slip casting alumina in a latex suspension to form high alumina content articles having a uniform density and substantially void free surfaces. These are typically fired at temperatures of 1620° for two hours. The surface roughness of the 94 percent alumina body is on the average of 350 microinches from peak to valley.

The most important aspect of the present invention is directed to the glaze which is applied to the alumina substrate. Typically the glaze has a thickness of about 2–3 mils with the ratio of the alumina ceramic body to glaze being approximately 10:1. The glaze functions to fill in the topography of the ceramic to leave a uniform film on the surface of the ceramic. The glaze of the present invention is particularly suitable for forming microcircuits from high alumina ceramic substrates in terms of the requirements of chemical composition, surface stress, thermal shock, thermal expansion, working temperatures, and working characteristics. In terms of chemical composition, the glaze contains no free alkali and is stable in a dry hydrogen atmosphere to 800° C. No preferential etching of the surface of the glaze occurs after emersing the glazed surface for 30 seconds in a 1:1:2 by volume etching solution of hydroflouric acid, nitric acid, and distilled water at room temperature. The substrate did not evidence any type of fracture in the body or glaze after being subjected to a heat treatment cycle involving heating from room temperature to 500° C. in air, holding at this temperature for 15 minutes, and returning to room temperature at a rate of not less than 20° C. per minute. The thermal expansion of the glaze is generally in the range of $58–75\times10^{-7}$ per ° C. over a temperature range of 25–600° C. The glaze is sufficiently refractory to be compatible with the frit capacitor operation at a temperature of about 950° C. Furthermore, the working characteristics of the glaze are such that there is a minimum of water solubility to permit water spray application. The glass is capable of firing to a one microinch or smoother surface finish at a maximum temperature of 450° for 30 minutes and the glaze will not devitrify when fired in a continuous glazing kiln.

The glass composition range from which the glaze can be formed in terms of mole percent is set forth hereing above. When the silica content is below 60 percent, chemical durability is poor while above 75 mole percent the firing temperature required to form glaze is too high. For alumina below 2.5 mole percent results in chemical durability being too poor whereas greater than 12.5 mole percent results in the thermal expansion coefficient becoming too low and the firing temperature required becoming too high. The effect of lanthanum oxide especially as a substitute for some of the alumina allows the expansion coefficient to be increased without sacrificing chemical durability or temperature capability. However, over 10.0 mole percent results in the expansion becoming too high. Below 15 mole percent barium oxide results in the expansion of the blaze becoming too low to be compatible with the alumina substrate, whereas above 30 mole percent the expansion becomes too high. Strontium oxide, calcium oxide, and magnesium oxide may generally be used in partial replacements for barium oxide. This substitution may improve chemical durability and permits adjustment of expansion coefficients. However, detrimental effects occur when these are added in greater than 10 mole percent especially in that the expansion coefficient becomes too low. The presence of minor amounts of boric oxide, up to about five mole percent, act to adjust the viscosity and the viscosity-temperature characteristics of glaze and thereby facilitating application of smoother coatings on the alumina body. However, too much boric oxide, greater than five mole percent, lowers the viscosity to such a level that the temperature capability of the glaze is lost.

The glaze is applied to the ceramic substrate using generally conventional techniques. Thus, after the glass is conventionally melted under standard conditions in a non-reactive refractory furnace, it is ground to a particle size of approximately less than 325 mesh, U.S. Standard size. The finely divided particulated glass is then suspended in a vehicle of nitrocellulose in amylacetate and coated on one surface of the high alumina ceramic body. Subsequently the water is evaporated and the coated ceramic is heated to a temperature and for a sufficient time to form a continuous glaze. More specifically a high alumina ceramic body comprising about 94 percent alumina is sprayed with a suspension of the particulated glass composition. The sprayed substrate is then furnace fired in a crucible at temperatures in the range of from 1300–1400° C. for a period of 7–15 minutes for the purpose of vitrifying the applied coating. The resulting alumina ceramic body having a relatively alkali free vitreous coating is then used as a substrate for the deposition of thin films in microcircuitry techniques. The resulting vitreous surface coating may have a thickness of from about 0.0075–0.015 inches, with the thickness of such coating depending on the spraying technique employed, the length of the spraying time, and the time and temperature of the firing procedure.

Our invention is further illustrated by the following examples:

EXAMPLE I

A glass composition suitable for use as a glaze for a high alumina content ceramic body was prepared and melted from the following formulation:

TABLE I

| Oxide | Wt. percent | Mole percent | Batch materials | Wt. (grams) |
|---|---|---|---|---|
| $SiO_2$ | 46.65 | 70.3 | Acid washed sand | 233.3 |
| $Al_2O_3$ | 3.05 | 2.70 | Calcined alumina | 15.3 |
| BaO | 27.49 | 16.2 | Barium carbonate | 180.4 |
| $La_2O_3$ | 19.47 | 5.40 | Lanthanum oxide | 97.4 |
| CaO | 3.35 | 5.40 | Calcium carbonate | 30.0 |

The batch materials were weighed, and then mixed by ball milling. The mixed batch was melted in a platinum crucible at a furnace temperature of 1500° C. for four hours. Thereafter the molten glass was rolled into a thin sheet, crushed and screened to 325 mesh U.S. Standard size. The properties of the glass are set forth in Table III hereinbelow.

The powdered glass was mixed with a suspending medium of carbowax and water and then sprayed onto one surface of a high alumina content ceramic body (94% alumina) having the dimensions of 1½ x 2 x 0.030 inches. The coated body was heated slowly to drive off the water. It was then heated to 1350° C. for ten minutes to consolidate the glaze on the surface of the alumina body. Upon cooling rapidly to prevent devitrification, the glazed ceramic body could now be used as a substrate for thin-film microcircuits. It was found that the glazed ceramic body had a warpage of less than 0.002 inch per inch.

EXAMPLE II

Following the procedure of Example I, another glass composition suitable for glazing a high alumina content ceramic body was prepared and melted from the following formulation:

TABLE II

| Oxide | Weight percent | Mole percent |
|---|---|---|
| $SiO_2$ | 46.2 | 69.1 |
| $Al_2O_3$ | 3.07 | 2.71 |
| BaO | 27.2 | 15.9 |
| $La_2O_3$ | 19.3 | 5.32 |
| CaO | 3.31 | 5.31 |
| $B_2O_3$ | 0.82 | 1.60 |

| Batch material: | Weight (grams) |
|---|---|
| Berkeley fine dry sand (−48) | 695.7 |
| Alcoa T-61 calcined alumina | 45.6 |
| Barium carbonate (TV) | 531.6 |
| Lanthanum oxide | 289.5 |
| Calcium carbonate | 62.4 |
| Boric acid | 21.9 |
| Calcium chloride | 29.7 |

The glaze (the properties of which are described hereinbelow) was applied to one surface of a 94% alumina body as described in Example I. This glass was easily workable and provided a smooth uniform glazed surface. There was no bowing of the glaze-ceramic body composite and the glaze had a very high restivity, good acid durability and its viscosity was in the proper range.

The properties of the glasses are summarized as follows:

TABLE III.—PROPERTIES OF ALUMINA SUBSTRATE GLAZES

| | Ex. I | Ex. II |
|---|---|---|
| Softening Point, ° C | 920 | 900 |
| Annealing Point, ° C | 745 | 730 |
| Strain Point, ° C | 698 | 686 |
| Expansion coefficient, $\times 10^7$/° C. (0°-300° C.) | 69.1 | 70.1 |
| Density, g./cc | 3.494 | 3.446 |
| Log resistivity (ohm-cm.): | | |
| 250° C | 14.9 | 15.1 |
| 350° C | 12.5 | 12.6 |
| 500° C | 10.0 | 9.9 |
| Young's modulus, $\times 10^{-6}$, p.s.i | | 11.33 |
| Shear modulus, $\times 10^{-6}$, p.s.i | | 4.45 |
| Poisson's ratio | | 0.274 |
| Knoop hardness ($KHN_{100}$) | 574 | ------- |
| Liquidus, ° C | 1,267 | 1,179 |
| Viscosity at liquidus, poises | 1,000 | 3,000 |
| Viscosity at 1,500° C., poises | 60 | 43 |
| Durability, 5% HCL, 95° C., 24 hrs., wt. loss, mg./cm.$^2$ | 0.03 | 0.09 |

We claim:

1. A substantially alkali-free improved glazed ceramic body of high alumina content for use as a substrate in microcircuitry, wherein the glaze consists essentially as calculated from the batch on the oxide basis of:

| Ingredient: | Mole percent |
|---|---|
| $SiO_2$ | 60–75 |
| $Al_2O_3$ | 2.5–12.5 |
| $La_2O_3$ | 2.5–10.0 |
| BaO | 15–30 |

said glaze having a thermal coefficient of expansion of about $58–75 \times 10^{-7}$ per C. (25–600° C.).

2. The glazed ceramic body of claim 1, wherein said glaze contains additionally, as calculated from the batch on the oxide basis, 0–10 mole percent of an oxide of an alkali earth metal selected from the group consisting of magnesium, calcium, strontium and mixtures thereof.

3. The glazed ceramic body of claim 2, wherein said glaze contains additionally as calculated from the batch on the oxide basis of 0–5 mole percent of boric oxide.

4. The glazed ceramic body of claim 1, wherein said glaze is located on only one surface of the ceramic body.

5. The glazed ceramic body of claim 4, wherein the glaze has an average thickness of about 2–3 mils.

6. The glazed ceramic body of claim 1, wherein the body has a maximum warpage of 0.002 inch per inch.

7. An alkali-free glaze for a high alumina content ceramic body consisting essentially as calculated from the batch on the oxide basis of:

| Ingredient: | Mole percent |
|---|---|
| $SiO_2$ | 60–70 |
| $Al_2O_3$ | 2.5–12.5 |
| $La_2O_3$ | 2.5–10.0 |
| BaO | 15–30 |

said glaze having a thermal coefficient of expansion of about $58–75 \times 10^{-7}$ per c. (25–600° C.).

8. The glaze of claim 7, containing additionally, as calculated from the batch on the oxide basis, 0–10 mole percent of an oxide of an alkaline earth metal selected from the group consisting of magnesium, calcium, strontium, and mixtures thereof.

9. The glaze of claim 8, containing additionally, as calculated from the batch on the oxide basis, 0–5 mole percent of boric oxide.

References Cited

UNITED STATES PATENTS 3,124,470 3/1964 Arthur ---------- 106—52
3,173,779 3/1965 Navias ---------- 106—54 X

OTHER REFERENCES

Brewster, G. F.; Kreidl, N. J.; and Pett, T. G. Lanthanum and Barium in Glass-Forming Systems, in Journal Society Glass Technology. (31), pages 153–169, 1947. Patent Office Scientific Library.

HELEN M. McCARTHY, Primary Examiner

MARK L. BELL, Assistant Examiner

U.S. Cl. X.R.

106—46, 52, 54; 317—234